Feb. 24, 1953 J. N. WEILAND 2,629,470
CLUTCH MECHANISM

Filed Nov. 23, 1949 4 Sheets-Sheet 1

INVENTOR.
JOHN N. WEILAND
BY
Gustav A. Wolff
ATT

INVENTOR.
JOHN N. WEILAND

Feb. 24, 1953 — J. N. WEILAND — 2,629,470

CLUTCH MECHANISM

Filed Nov. 23, 1949 — 4 Sheets-Sheet 4

INVENTOR.
JOHN N. WEILAND
BY
Gustav A. Wolff
ATT

Patented Feb. 24, 1953

2,629,470

UNITED STATES PATENT OFFICE 2,629,470

CLUTCH MECHANISM

John N. Weiland, Cleveland, Ohio

Application November 23, 1949, Serial No. 129,003

13 Claims. (Cl. 192—18)

1

The present invention relates to combined clutch and brake mechanism of the friction type generally used to control the operation of various different types of power driven machine tools and is especially adapted for use on power driven machines with continuously driven fly-wheels, which machines through a clutch mechanism transmit the motion and energy of their fly-wheels to the parts to be driven and arrest the motion of the driven parts by brake mechanism actuated upon when the clutch mechanism is disconnected.

The general object of the invention is the provision of a fluid-operated, combined clutch and brake mechanism for power driven machines of the type referred to above, the mechanism embodying axially-shiftable clutch and brake shoe means and combined fluid-operated and pretensioned spring-actuated, axially-rotatable shifting means coupled with said clutch and brake shoe means to effect braking action when the fluid-operated shifting devices are inoperative and release such braking action and induce a clutching action when the fluid-operated shifting devices are actuated.

Another object of the invention is the provision of a fluid-operated, combined clutch and brake mechanism for power driven machines of the type referred to above, the mechanism embodying individual, axially-shiftable clutch shoe members with flat or level friction surfaces, individual brake shoe members also including flat or level friction surfaces, axially-rotatable supporting and shifting means mounting and actuating the clutch shoe members and the brake shoe members and cooperating fluid-operated and spring-actuated means coupled with the axially-rotatable supporting and shifting means to effect selective clutching and braking action of the shoe members when the supporting and shifting means are actuated by either the fluid-operated or spring-actuated means.

A further object of the invention is the provision of a fluid and spring power operated, combined clutch and brake mechanism for power driven machines of the type referred to above in which individual, shiftable, clutch shoe means and individual, shiftable brake shoe means are supported by axially, non-shiftably, rotatably mounted supporting and shifting means, the opposite ends of which are threadedly engaged with the shoe members to effect selective shifting of the shoe members in one or the other direction when the supporting and shifting means are rotated in opposite directions by fluid or spring power of the mechanism.

Still another object of the invention is the provision of a fluid and spring power operated, combined clutch and brake mechanism for power driven machines of the type referred to above,

2 which mechanism includes individual, substantially axially-shiftable clutch shoe members with flat or level friction surfaces, individual, substantially axially-shiftable, spring-actuated brake shoe members with flat or level friction surfaces and fluid-actuated, axially-non-shiftably but rotatably mounted supporting and shifting means for the shoe members, the shifting means having their opposite ends threaded and threadedly engaged with the shoe members to effect shifting of the clutch shoe members for clutching action by fluid-actuated rotation of the supporting and shifting means and automatic braking action of the brake shoe members by the force of springs actuating same whenever fluid power effecting rotation of the supporting and shifting means is shut off.

With the above and other incidental objects in view which will appear hereinafter, the invention consists in certain other novel features of construction and combination of parts, the essential elements of which are set forth in the appended claims; and a preferred form of embodiment of the invention is hereinafter shown with reference to the drawings accompanying and forming part of the specification.

Figure 1:
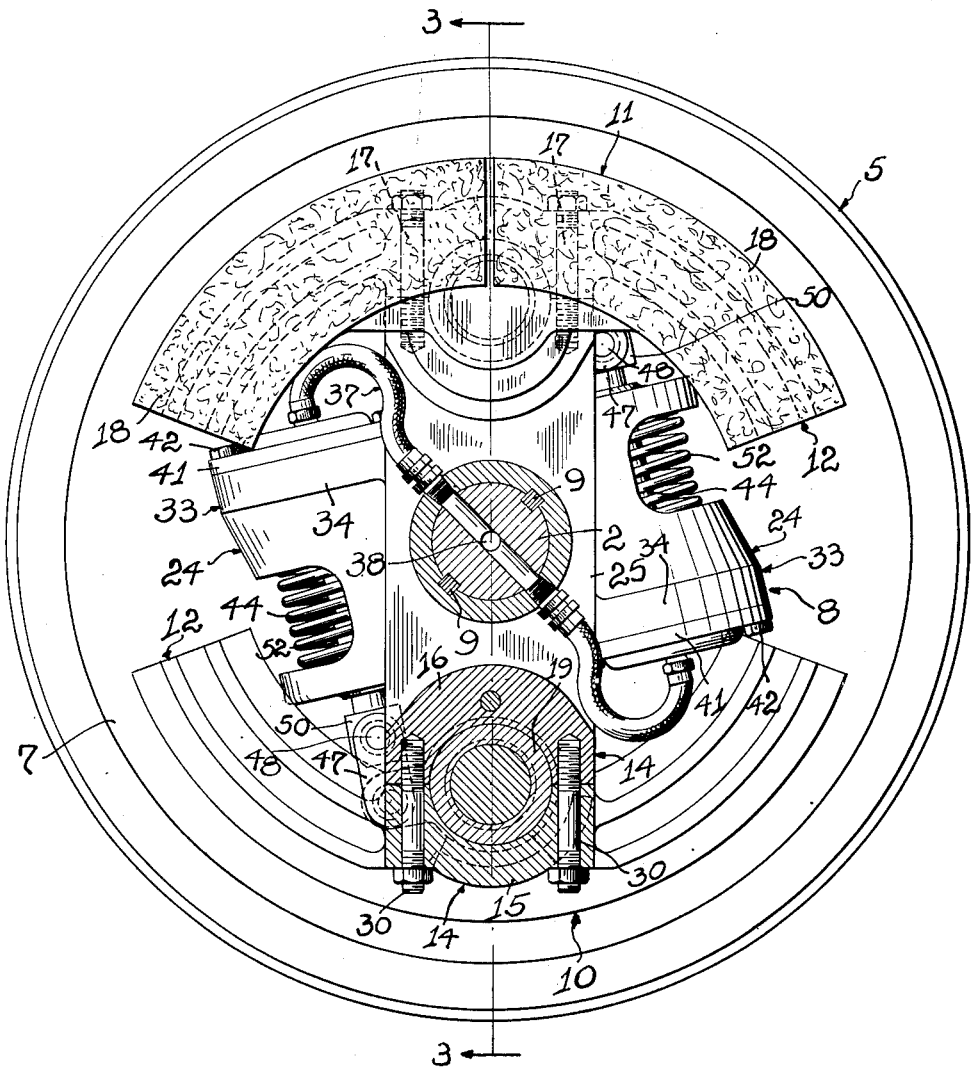
Fig. 1 is an end view of a fluid-operated clutch and brake mechanism constructed in accordance with the invention, the mechanism being shown attached to and coupled with the driven shaft and fly-wheel of a power driven machine, such as a power press, the section being taken on line 1—1 of Fig. 3 of the drawing.
Figure 2:
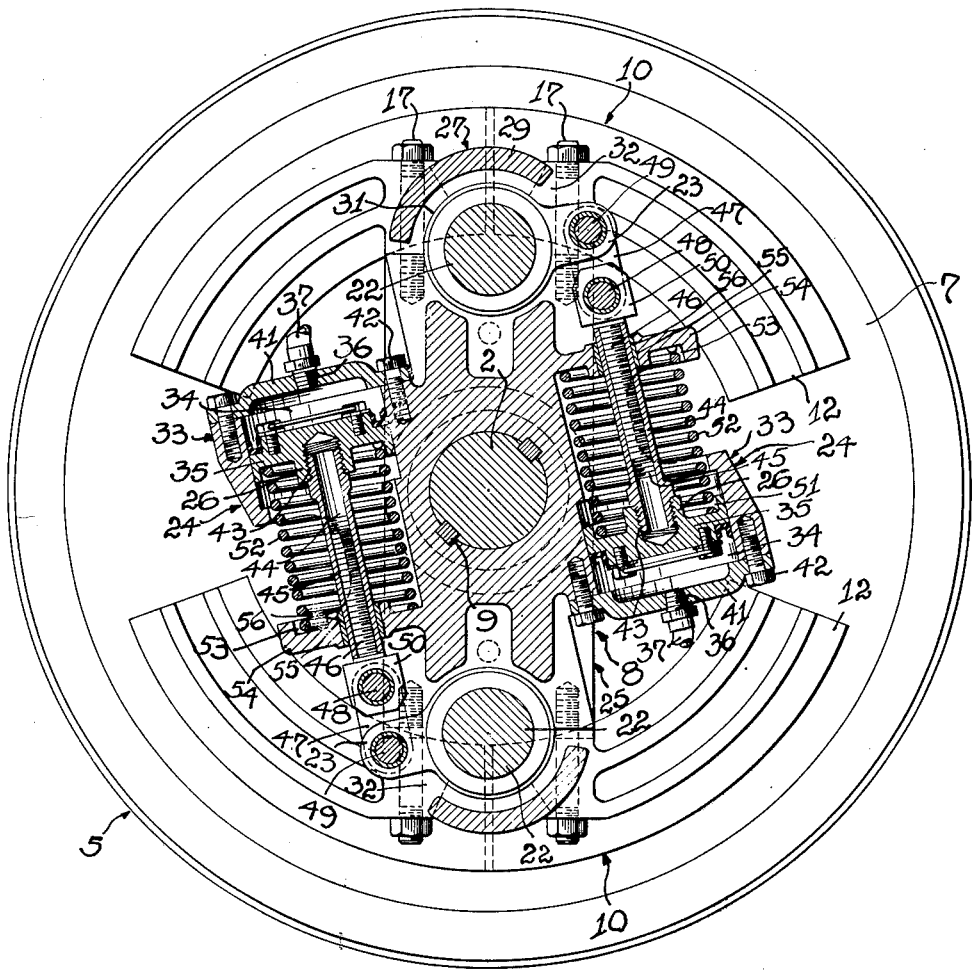
Fig. 2 is a transverse sectional view through Fig. 3, the section being taken on line 2—2 of Fig. 3.
Figure 3:
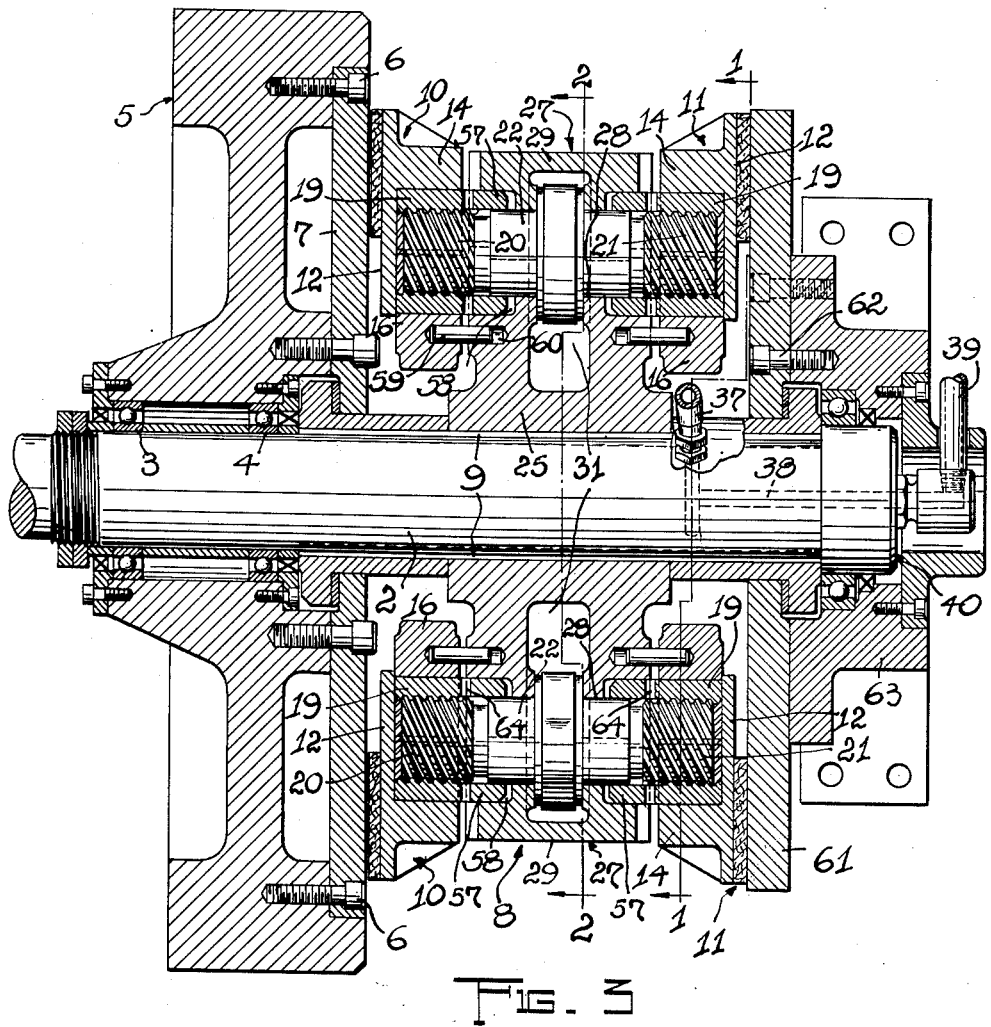
Fig. 3 is a longitudinal sectional view through the fluid-operated clutch and brake mechanism shown in Fig. 1, the section being taken on line 3—3 of Fig. 1.
Figure 4:
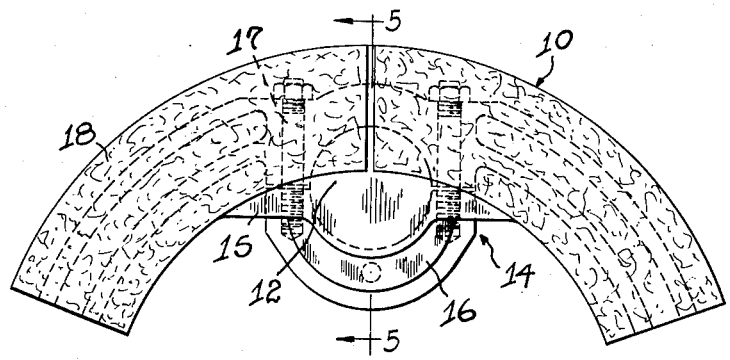
Fig. 4 is a side view of a clutch shoe member.
Figure 5:
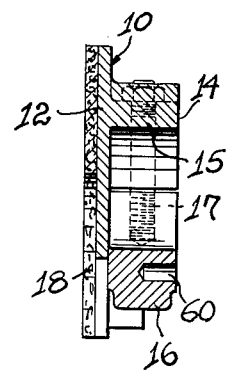
Fig. 5 is a cross-sectional view on line 5—5 of Fig. 4.
Figure 6:
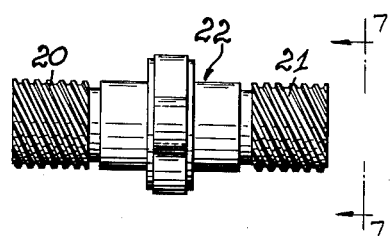
Fig. 6 is a side view of the rotary shoe supporting and shifting member.
Figure 7:
Fig. 7 is an end view of Fig. 6.
Figure 8:
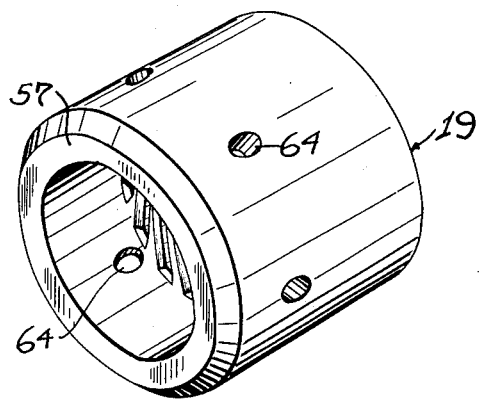
Fig. 8 is a perspective view of the nut member which in the assembled structure is threadedly engaged with the shoe supporting and shifting member.

Referring now more in detail to the exemplified form of the invention shown in the drawings, reference numeral 2 denotes the crank-shaft of a power driven machine such as a power press, which shaft freely-rotatably mounts on ball bearings 3 and 4 a fly-wheel 5 driven in any suitable manner. Fly-wheel 5 has attached to its side by means of screws 6 a ring-shaped disk 7 which forms a friction disk for a clutch and brake mechanism 8 mounted on crank shaft 2 and keyed thereto by key members 9. This clutch and brake mechanism includes two pairs of symmetrically arranged clutch and brake shoe members 10 and 11, all of which, as shown, are of identical construction though the clutch and brake shoe members may be differently constructed should it be desirable to increase the clutching or braking action as the case may be. These shoe members each consist of a flat plate 12 having the outline of a sector of a ring-shaped disk, which plate has extended from its rear face a clamp-like member 14 including a main portion 15 integrally formed with plate 12 and a clamping yoke 16 secured to main portion 15 by clamping bolts 17. The front face of plate 12 is lined with brake lining 18 to insure the desired clutching or braking action of the shoe members as will be later described.

Each one of the clutch and brake shoe members 10 and 11 supports and rigidly holds in its clamp-like member 14 a nut member 19 which couples such shoe member with the respective threaded end portion 20 or 21 of a supporting and shifting rod 22 formed with a perforated lever arm 23 extended laterally from said rod midway between its opposite ends.

The threads of nut member 19 and the corresponding threads of the end portions 20 and 21 of rod 22 are of the multiple-thread type to insure proper lead and the required movement of the shoe members when the freely-rotatably mounted supporting and shifting rod 22 is rotated in one or the other direction by actuating mechanism 24 later to be described.

Each supporting and shifting rod 22 is rotatably mounted in a base member 25 keyed to the crank shaft 2 by the key members 9. For such purpose base member 25 journals each rod 22, base member 25 forming a pillow 28 of a journal-like structure 27 including a cap 29 secured to the base member by screw members 30. The journal-like structure 27 is formed in its central portion with an enlarged chamber 31 and a slot 32 extending from said chamber to permit proper engagement of the lever arm 23 of rod 22 with the actuating mechanism 24.

This actuating mechanism embodies for each shifting rod 22 a fluid-operated shifting device 33 having a cylinder 34 formed as an integral part of base member 25 and a piston 35. Shifting of the piston 35 of the fluid-operated shifting device is effected in one direction when fluid enters into the cylinder 34 through a passage 36 in its bottom wall. This passage communicates by a hose member 37 with a bore 38 in shaft 2, which bore is fed with fluid under pressure from a source of supply (not shown) by a pipe 39 connected with shaft 2 by a rotary sealing device 40. The cylinder 34 includes a cover-like bottom member 41 secured to base member 25 by screws 42 and readily removable therefrom for proper access to piston 35 in assembly, disassembly and repair procedures.

The piston 35 is formed with a central boss 26 having a threaded bore 43 mounting a tubular piston rod 44. This piston rod supports in its axial bore 45 an axially adjustable extension rod 46 threadedly connected with piston rod 44 and coupled by a link 47 with lever arm 23 by pivot pins 48 and 49 which connect the link to lever arm 23 and the perforated head portion 50 of extension rod 46. Piston 35 furthermore is recessed at 51 to form a seat for the one end of a compression coil spring 52, the other end of which engages a recessed seat 53 formed in a laterally extended portion 54 of base member 25 opposite to cylinder 34. Portion 54 includes a bore 55 aligned with piston rod 44 and mounts in said bore a bearing sleeve 56 through which said piston rod 44 slidably extends.

The clutch and brake shoe members 10 and 11, threadedly engaged with the threaded end portions 20, 21 of the supporting and shifting rod 22 have the one end portions 57 of their nut members 19 slidably extended into circular recesses 58 of base member 25 to properly guide the shoe members when shifted by rod 22 and avoid chattering of these shoes in clutching and braking operations. In addition clutch and brake shoe members 10 and 11 are prevented from rotation with respect to base member 25 by dowel-like pins 59 rigidly mounted in bores 60 in the clamping yokes 16 of the clamp-like members 14 and slidably extended into bores 60 in base member 25.

In operation shoe members 10 and 11—members 11 of which cooperate with a ring-shaped friction disk 61 attached by screws 62 to frame 63—are shifted into clutching operation when fluid under pressure through pipe 39, bore 38 and passage 36 enters into cylinders 34 and shifts pistons 35 so as to rotate shifting rods 22 in a counterclockwise direction. This rotation effects shifting of the clutch shoe members 10 into engagement with friction disk 7 and shifting of the friction shoe members 11 away from the friction disk 6. A release of the pressure fluid which may be effected in any customary manner automatically effects a braking action as at the time the fluid under pressure in cylinders 34 is released, the spring pressure of pretensioned coil springs 52 effects rotation of shifting rods 22 in a clockwise direction. Such rotation effects shifting of the brake shoe members 11 into engagement with the stationary friction disk 61 and shifting of the clutch shoe members 10 away from the friction disk 7.

A combined clutch and brake mechanism of the type described is of simple construction and permits quick and efficient assembly and disassembly of the structure. The mechanism furthermore can readily and easily be adjusted in case of wear of the linings on the clutch and brake shoe members which adjustment is readily effected when the clamping bolts 17 securing clamping yoke 16 to the main portion 15 of the clamp-like member 14 are loosened up to permit slight rotation of nut member 19 by a tool inserted in its perforations 64. Such rotation of nut member 19 effects shifting of the respective shoe members into proper position for efficient and quick clutching and braking operations.

Having thus described my invention:

What I claim is:

1. In clutch and brake mechanism an axially rotatable base member, parallelly arranged clutch and brake shoe means shiftably supported by said base member in axially offset relation with respect to its rotary axis, to be shifted parallel to said rotary axis, each of said shoe means including a nut member rearwardly extended therefrom, a threaded rod having its opposite ends threadedly engaged with the nut members of said shoe means, said rod being rotatably and axially non-shiftably supported in said base member in laterally offset, parallel relation with respect to its rotary axis and actuating means on said base member coupled with said rod and adapted to effect rotating same selectively in opposite directions for selective shifting of said clutch and brake shoe means with respect to said base member, parallel to the rotary axis thereof.

2. In clutch and brake mechanism an axially rotatable base member cooperating pairs of parallelly arranged clutch and brake shoe means shiftably supported by said base member in axially offset relation with respect to its rotary axis to be shifted parallel to said rotary axis, each of said clutch and brake shoe means including internally threaded extensions rearwardly thereof, a shifting member for each of said pairs of clutch and brake shoe means rotatably and axially non-shiftably mounted in said base member, said shifting member including threaded end extensions engaged with the threaded portions of said clutch and brake shoe means adapted to shift same toward and away from said base member in parallel relation to its rotary axis when the shifting member is rotated in opposite directions.

3. In a clutch and brake mechanism a base member including an axial bore for mounting same on a shaft, parallelly arranged clutch and brake shoe members shiftably supported by said base member to extend from opposite sides thereof and to be shifted in parallel axially offset relation to the axis of said base member, parallel to said axis, shifting means for said clutch and brake shoe members rotatably, axially non-shiftably supported by said base member in parallel, offset relation to its axis, and cooperating threaded means on said shifting means and said clutch and brake shoe members adapted to shift same in parallel relation with respect to the axis of said base member when said shifting means are rotated.

4. A clutch and brake mechanism as described in claim 3, wherein each of said clutch and brake shoe members includes a nut member secured to the rear portion of said member, and wherein said shifting means embodies a shaft member having threaded end portions one of which is threadedly engaged with the nut member of a clutch shoe member and the other one of which is threadedly engaged with the nut member of a brake shoe member.

5. A clutch and brake mechanism as described in claim 3, wherein each of said clutch and brake shoe members includes a cylindrically shaped nut adjustably secured to said member by clamping means extended from the rear face of said member, and wherein said shifting means embodies a shaft member having threaded end portions one of which is threadedly engaged with the nut of a clutch shoe member and the other one of which is threadedly engaged with the nut of a brake shoe member.

6. A clutch and brake mechanism as described in claim 3, wherein each of said clutch and brake shoe members includes a cylindrically shaped nut having one end adjustably secured to said member by clamping means extended from the rear face of said member and having its other end slidably extended in a recess of said base member, and wherein said shifting means embodies a shaft member having threaded end portions one of which is threadedly engaged with the nut of a clutch shoe member and the other one of which is threadedly engaged with the nut of a brake shoe member.

7. In a clutch and brake mechanism a base member with an axial bore for mounting same on a shaft, pairs of parallelly arranged clutch and brake shoe members non-rotatably axially-shiftably supported by said base member in axially offset relation with respect to the axis of its bore, and threaded shifting rod means non-shiftably, axially-rotatably supported by said base member and threadedly coupled with said pairs of clutch and brake shoe members for shifting same with respect to said base member, each one of said pairs of clutch and brake shoe members including one clutch shoe member and one brake shoe member arranged at opposite sides of said base member, and each pair of said clutch and brake shoe members having its shoe members threadedly connected with the respective one of said threaded shifting means to effect joint shifting of the shoe members of a pair by axial rotation of its shifting means.

8. In a clutch and brake mechanism an axially rotatable base member, parallelly arranged clutch and brake shoe members shiftably and non-rotatably supported by said base member in axially offset relation with respect to its axis, axially-rotatable threaded shaft means non-shiftably supported by said member in axial alignment with said clutch and brake shoe means, said shaft means having end portions threadedly coupled with a clutch shoe member and a brake shoe member, a lever arm laterally extended from said shaft means, and a fluid-operated cylinder piston member mounted on said base member and having a piston coupled with said lever arm said cylinder piston member adapted to effect rotation of said shaft means and shifting of the clutch and brake shoe members threadedly coupled with the opposite end portions of said shaft means.

9. A clutch and brake mechanism as described in claim 8, wherein said fluid-operated cylinder piston member effects rotation of said rotatable shaft means in one direction only, and pretensioned spring means arranged within the piston of said cylinder piston member adapted to effect rotation of said rotatable shaft means in the opposite direction when said cylinder piston member is inactivated.

10. A clutch and brake mechanism as described in claim 8, wherein said fluid-operated cylinder piston member effects rotation of said rotatable shaft means in one direction only, and a coil spring member arranged within the cylinder of said cylinder piston member adapted to effect rotation of said rotatable shaft means in the opposite direction when said cylinder piston member is inactivated.

11. In clutch and brake mechanism an axially rotatable base member, parallelly arranged clutch and brake shoe means shiftably supported by said base member in offset relation with respect to its rotary axis, to be shifted parallel to said rotary axis, and rotary shifting means for said clutch and brake shoe means, said rotary shifting means including central portions axially-rotatably, non-shiftably mounted in said base member, and threaded end portions threadedly engaged with the clutch and brake shoe means, said rotary shifting means, when selectively rotated, adapted to effect selective shifting of the clutch and brake shoe means with respect to said base member parallel to the rotary axis thereof.

12. In clutch and brake mechanism an axially rotatable base member, parallel clutch and brake shoe means arranged at opposite sides of said base member and axially shiftably supported thereby in offset relation with respect to the rotary axis thereof, to be shifted parallel to said rotary axis, rotary shifting means for said clutch and brake shoe means axially-rotatably, non-shiftably mounted in said base member, said rotary shifting means including central portions supported in said base member and threaded end portions threadedly engaged with said clutch and brake shoe means, and fluid-operated and spring-actuated means coupled with said shifting means adapted to selectively rock same in opposite directions to effect selective shifting of said clutch and brake shoe means with respect to said base member parallel to the rotary axis thereof.

13. The combination of a power driven machine having a frame, a crank shaft, a fly-wheel freely rotatably mounted on said shaft, a clutch and brake mechanism mounted on said crank shaft adjacent to said fly-wheel coaxial therewith, a ring-shaped backing disk rigidly attached to the side of said fly-wheel opposite one side of said clutch and brake mechanism, and a stationary, ring-shaped disk rigidly attached to the frame opposite the other side of said clutch and brake mechanism, said clutch and brake mechanism including a base member rigidly mounted on said crank shaft, frictional clutch shoe members shiftably and non-rotatably mounted on said base member in axially offset relation to the crank shaft opposite to the backing plate on the fly-wheel, frictional brake shoe members shiftably and non-rotatably mounted on said base member parallel to said clutch shoe members opposite to the stationary disk, and threaded shifting shaft means for said shoe members arranged therebetween and axially-rotatably, non-shiftably mounted in said base member, said clutch and brake shoe members arranged in cooperating pairs, each pair including a single clutch and a single friction shoe member and each pair having its shoe members threadedly engaged with the threaded ends of one of the threaded shifting shaft means, and pneumatically operated actuating means mounted on said base member and coupled with said threaded shifting shaft means, said actuating means adapted to rotate the shifting shaft means to effect joint shifting of the shoe members toward either one of said ring-shaped disks.

JOHN N. WEILAND.

REFERENCES CITED

The following references are of record in the file of this patent:

UNITED STATES PATENTS

| Number | Name | Date |
|---|---|---|
| 2,205,989 | Meyers et al. | June 25, 1940 |
| 2,458,664 | Weiland | Jan. 11, 1949 |

FOREIGN PATENTS

| Number | Country | Date |
|---|---|---|
| 120,414 | Germany | June 27, 1900 |